(12) United States Patent
Kim et al.

(10) Patent No.: US 9,769,408 B2
(45) Date of Patent: Sep. 19, 2017

(54) APPARATUS FOR CONTROLLING PIXEL OUTPUT LEVEL AND IMAGE SENSOR

(71) Applicant: Samsung Electronics Co., Ltd., Suwon-Si, Gyeonggi-Do (KR)

(72) Inventors: Yun-Hong Kim, Suwon-si (KR); Min-Jin Kong, Changwon-si (KR); Tae-Chan Kim, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 246 days.

(21) Appl. No.: 14/536,968

(22) Filed: Nov. 10, 2014

(65) Prior Publication Data
US 2015/0136953 A1    May 21, 2015

(30) Foreign Application Priority Data

Nov. 15, 2013  (KR) .......................... 10-2013-0139319

(51) Int. Cl.
H04N 5/378    (2011.01)
H04N 5/357    (2011.01)

(52) U.S. Cl.
CPC ........... *H04N 5/378* (2013.01); *H04N 5/3575* (2013.01)

(58) Field of Classification Search
CPC ............................. H04N 5/3575; H04N 5/378
See application file for complete search history.

(56) References Cited

U.S. PATENT DOCUMENTS

| | | | |
|---|---|---|---|
| 5,969,758 A | 10/1999 | Sauer et al. | |
| 6,753,912 B1 | 6/2004 | Wayne | |
| 7,378,694 B2 | 5/2008 | Yi et al. | |
| 7,394,491 B2 | 7/2008 | Bae et al. | |
| 8,063,965 B2 * | 11/2011 | Wang | H04N 5/243 250/208.1 |
| 8,242,546 B2 | 8/2012 | Hynecek | |
| 8,446,504 B2 | 5/2013 | Taruki et al. | |
| 2007/0147132 A1 | 6/2007 | Lee et al. | |
| 2008/0036890 A1 * | 2/2008 | Yamashita | H04N 5/3598 348/308 |
| 2011/0267522 A1 | 11/2011 | Gendai et al. | |
| 2011/0290985 A1 * | 12/2011 | Kume | H01L 27/14609 250/208.1 |
| 2012/0132786 A1 | 5/2012 | Mori et al. | |
| 2012/0268638 A1 | 10/2012 | Hsu et al. | |
| 2012/0280113 A1 | 11/2012 | Kim et al. | |

FOREIGN PATENT DOCUMENTS

JP    2005229292 A    8/2005
KR    101241466 B1    3/2013

\* cited by examiner

*Primary Examiner* — Francis M Legasse, Jr.
(74) *Attorney, Agent, or Firm* — Harness, Dickey & Pierce, P.L.C.

(57) ABSTRACT

An apparatus for controlling a pixel output level includes a column signal line connected to an output node of at least one pixel sensor. The apparatus includes a load circuit is connected between the column signal line and a ground terminal. The apparatus also includes a level adjusting circuit configured to adjust a voltage level of a pixel signal output from the at least one pixel sensor to the column signal line based on a correction target value.

14 Claims, 15 Drawing Sheets

APPARATUS FOR CONTROLLING PIXEL OUTPUT LEVEL AND IMAGE SENSOR

CROSS-REFERENCE TO RELATED APPLICATIONS

This application claims the benefit of Korean Patent Application No. 10-2013-0139319, filed on Nov. 15, 2013, in the Korean Intellectual Property Office, the disclosure of which is incorporated herein in its entirety by reference.

BACKGROUND

At least one inventive concept relates to an image sensor, and more particularly, to an apparatus for controlling a pixel output level and/or an image sensor using the same.

An image sensor is a device which converts an optical image signal into an electrical image signal. The image sensor generates image data from an electrical image signal by using a correlated double sampling circuit. In order to improve the performance of the image sensor, improving the noise characteristics and the dynamic range characteristic of the correlated double sampling circuit is desired.

SUMMARY

At least one inventive concept provides an apparatus for controlling a pixel output level which corrects an offset in a column signal line of a pixel array and/or improves the dynamic range characteristic of a correlated double sampling circuit.

The inventive concepts also provide an image sensor for correcting an offset in a column signal line of a pixel array and/or improving the dynamic range characteristic of a correlated double sampling circuit.

According to at least one example embodiment, an apparatus for controlling a pixel output level includes a column signal line connected to an output node of at least one pixel sensor. The apparatus includes a load circuit connected between the column signal line and a ground terminal. The apparatus includes a level adjusting circuit configured to adjust a voltage level of a pixel signal output from the at least one pixel sensor to the column signal line based on a correction target value.

According to at least one example embodiment, the correction target value is for one of correcting an offset in the column signal line and correcting a correlated double sampling decision delay.

According to at least one example embodiment, the level adjusting circuit is configured to adjust the voltage level of the pixel signal in an interval associated with a correlated double sampling operation.

According to at least one example embodiment, the level adjusting circuit comprises a current source configured to generate a current corresponding to a bias voltage based on the correction target value. The level adjusting circuit also includes a switching unit configured to provide the generated current to the column signal line based on a switching control signal.

According to at least one example embodiment, the switching unit includes a transistor. A first terminal of the transistor is connected to an output terminal of the current source, and a second terminal of the transistor is connected to the column signal line. The switching control signal is applied to a gate terminal of the transistor. The transistor is turned on in an interval associated with a correlated double sampling operation based on the switching control signal.

According to at least one example embodiment, the level adjusting circuit is configured to adjust the voltage level of the pixel signal in a range between a maximum voltage level and a minimum voltage level of a ramp signal used in a correlated double sampling operation.

According to at least one example embodiment, the level adjusting circuit is configured to adjust the voltage level of the pixel signal in at least one of a reset phase interval when the at least one pixel sensor is in a reset state and a signal phase interval when the at least one pixel sensor is in a readout state.

According to at least one example embodiment, the level adjusting circuit is configured to determine the correction target value based on digital pixel data generated as a result of an optical signal of a test pattern sensed by the at least one pixel sensor.

According to at least one example embodiment, the level adjusting circuit is configured to apply the correction target value in at least one of a reset phase interval when the at least one pixel sensor is in a reset state and a signal phase interval when the at least one pixel sensor is in a readout state.

According to at least one example embodiment, the load circuit includes an active load configured to generate a current corresponding to a load bias voltage.

According to at least one example embodiment, the at least one pixel sensor includes a photodetector and a plurality of transistors. At least one of the plurality of transistors is a source follower amplifier transistor configured to transmit the pixel signal to the column signal line in a reset phase interval when the at least one pixel sensor is in a reset state and a signal phase interval when the at least one pixel sensor is in a readout state.

According to at least one example embodiment, an image sensor includes a pixel array, a load circuit, a level adjusting circuit, a correlate double sampling circuit and an analog-to-digital conversion circuit. The pixel array is configured to convert an optical signal into a pixel signal and output the pixel signal to a column signal line. The load circuit is connected between the column signal line and a ground terminal. The level adjusting circuit is configured to adjust a voltage level of the pixel signal output to the column signal line based on a correction target value. The correlated double sampling circuit is configured to perform a correlated double sampling operation based the adjusted voltage level of the pixel signal and a voltage level of a ramp signal. The analog-to-digital conversion circuit is configured to convert the pixel signal into digital pixel data based on a result of the correlated double sampling operation.

According to at least one example embodiment, the level adjusting circuit includes a current source configured to generate a current corresponding to a bias voltage based on the correction target value. The level adjusting circuit also includes a switching unit configured to provide the generated current to the column signal based on a switching control signal.

According to at least one example embodiment, the level adjusting circuit includes a bias voltage generation unit configured to generate a bias voltage based on digital pixel data generated in the analog-to-digital conversion circuit, the digital pixel data being based on an optical signal of a test pattern sensed by the pixel array. The level adjusting circuit also includes a current source configured to generate a current corresponding to the bias voltage, and a switching unit configured to provide the generated current to the column signal in an interval associated with the correlated double sampling operation.

According to at least one example embodiment, the switching unit is configured to provide the generated current to the column signal line in at least one of a reset phase interval when at least one pixel in the pixel array is in a reset state and a signal phase interval when the at least one pixel is in a readout state.

According to at least one example embodiment, a device includes a plurality of pixel sensors configured to output pixel signals to column lines, a voltage adjuster, and a correlated double sampler. The voltage adjuster is configured to adjust voltage levels of the pixel signals for each of the column lines based on target voltage levels. The correlated double sampler is configured to perform a correlated double sampling operation and output resultant signals based on the adjusted pixel signals and a reference signal.

According to at least one example embodiment, the target voltage levels are selected based on one of distortion of the pixel signals caused by the column lines and a delay associated with the correlated double sampling operation, and the reference signal is a ramp signal.

According to at least one example embodiment, the device includes a converter configured to convert the resultant signals into digital signals. In at least one example embodiment, the voltage adjuster is configured to determine the target voltage levels based on the digital signals if the digital signals represent a test pattern sensed by the pixel sensors.

According to at least one example embodiment, the test pattern obscures light incident to the pixel sensors.

According to at least one example embodiment, the device includes an active load connected to each column line at a node between the voltage adjuster and the correlated double sampler.

BRIEF DESCRIPTION OF THE DRAWINGS

Exemplary embodiments of the inventive concepts will be more clearly understood from the following detailed description taken in conjunction with the accompanying drawings in which.

DETAILED DESCRIPTION OF EXAMPLE EMBODIMENTS

Figure 1:
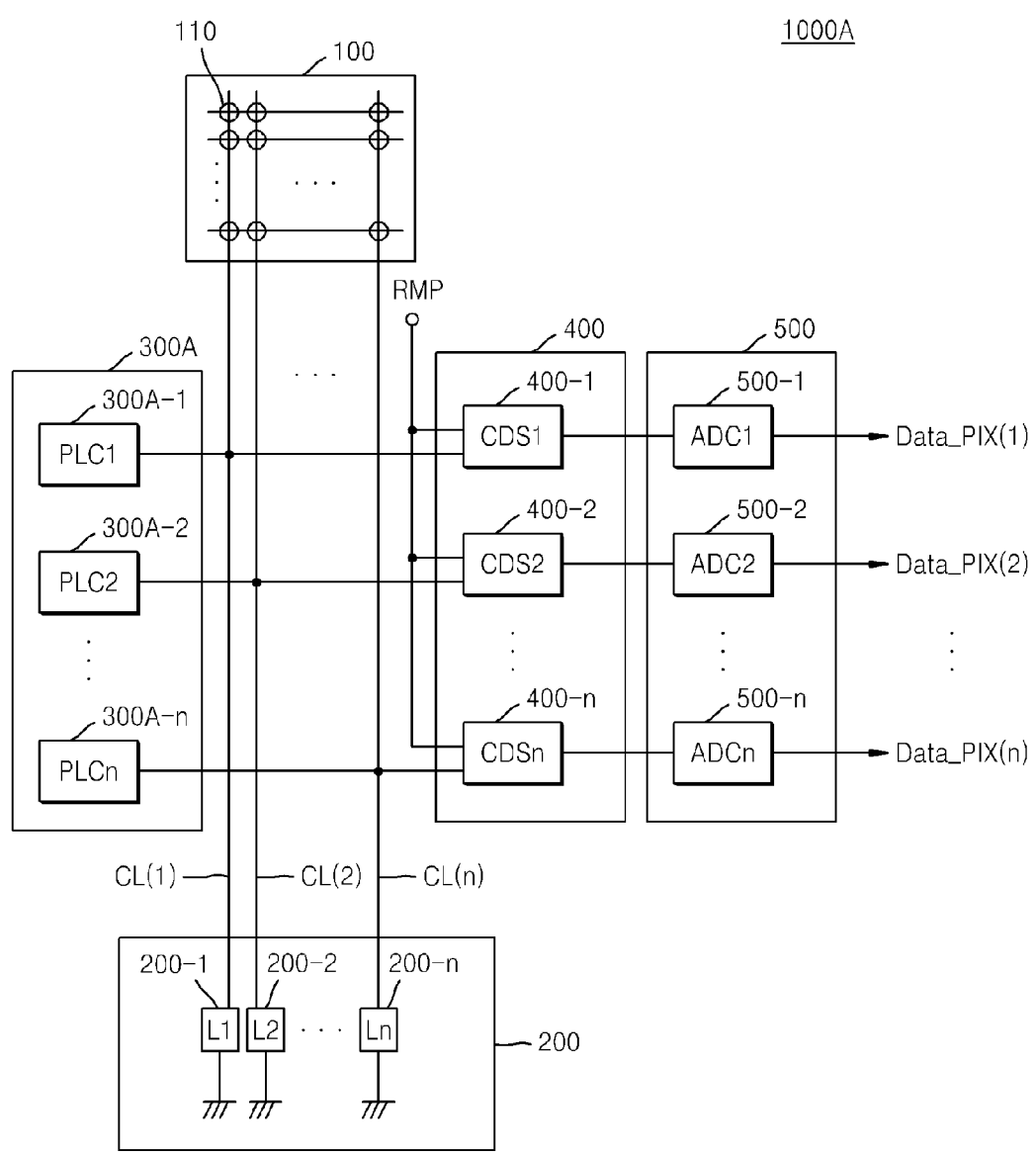
FIG. 1 is a schematic diagram of an image sensor according to at least one example embodiment.

Inventive concepts will now be described more fully with reference to the accompanying drawings, in which exemplary embodiments of the invention are shown. These example embodiments are provided so that this disclosure will be thorough and complete, and will fully convey the inventive concepts of to those skilled in the art. The inventive concepts may be embodied in many different forms with a variety of modifications, and a few embodiments will be illustrated in drawings and explained in detail. However, this should not be construed as being limited to the embodiments set forth herein, and rather, it should be understood that changes may be made in these exemplary embodiments without departing from the principles and spirit of the inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as at least one of," when preceding a list of elements, modify the entire list of elements and do not modify the individual elements of the list.

FIG. 1 is a schematic diagram of an image sensor 1000A according to at least one example embodiment.

As shown in FIG. 1, the image sensor 1000A includes a pixel array 100, a load circuit block 200, a level adjusting circuit block 300A, a correlated double sampling circuit block 400, and an analog-to-digital conversion circuit block 500.

The pixel array 100 includes a plurality of pixel sensors 110. The pixel array 100 has a structure in which the plurality of pixel sensors 110 in the form of a matrix are connected to each of a plurality of column signal lines CL(1) through CL(N) (N is a natural number equal to or greater than 2). Accordingly, a plurality of pixel sensors 110 arranged in the column direction in the pixel array 100 are connected to each of the column signal lines CL(1) through CL(N).

Each of the plurality of pixel sensors 110 converts a received optical signal into an electrical pixel signal and outputs the pixel signal to a column signal line. For example, the pixel sensor 110 includes a photodetector and a plurality of transistors. At least one of the plurality of transistors may be designed as a source follower amplifier transistor for transferring a pixel signal to a column signal line in a reset phase interval and a signal phase interval. Here, the reset phase interval and the signal phase interval may be intervals set for correlated double sampling processing of a pixel signal as explained below.

The plurality of pixel sensors 110 may include a plurality of color pixel sensors, for example, at least one red pixel sensor, at least one green pixel sensor, and at least one blue pixel sensor.

When the image sensor 1000A is provided as a 3-dimensional image sensor, the plurality of pixel sensors 110 may further include at least one depth pixel sensor in addition to the color pixel sensors. The depth pixel sensor may generate an optical charge corresponding to wavelengths in an infrared band.

The load circuit block 200 includes a plurality of load circuits L1 200-1 through LN 200-N, and in each column signal line, a single common load circuit is provided. That is, for each column signal line, one load circuit may be connected between the column signal line and a ground terminal.

For example, each of the plurality of load circuits L1 200-1 through LN 200-N may be provided as an active load circuit. Accordingly, the load circuit may be equivalently expressed as a current source in which a current corresponding to a load bias voltage flows.

The level adjusting circuit block 300A includes a plurality of level adjusting circuits PLC1 300A-1 through PLCN 300A-N, and to each of the column signal line, one level adjusting circuit is connected. Each of the plurality of level adjusting circuits PLC1 300A-1 through PLCN 300A-N may control, based on an initially set correction target value, the voltage level of a pixel signal output to the column signal line. The correction target value may be, for example, a target voltage level for the pixel signal. For example, a correction target value may be determined based on a decision delay quantity for generating a comparator output signal of a correlated double sampling circuit. The decision delay quantity corresponds to ΔTo shown in FIG. 6.

For example, each of the plurality of level adjusting circuits PLC1 300A-1 through PLCN 300A-N may perform an adjustment operation on the voltage level of a pixel signal output to the column signal line. The adjustment operation may be performed during in a correlated double sampling operation interval. For example, each of the plurality of level adjusting circuits PLC1 300A-1 through PLCN 300A-N may increase, in a correlated double sampling operation interval, the voltage level of a pixel signal output to the column signal line to an initially set voltage in order to correct a decision delay in the correlated double sampling circuit.

With this adjustment of the output voltage level of a pixel signal corresponding to an initially set correction target value, the dynamic range characteristic of a correlated double sampling circuit may be improved. This will be explained below in detail.

The correlated double sampling circuit block 400 includes a plurality of correlated double sampling circuits CDS1 400-1 through CDSN 400-N. As shown in FIG. 1, one correlated double sampling circuit is connected to each column signal line. For example, each of the plurality of correlated double sampling circuits CDS1 400-1 through CDSN 400-N performs correlated double sampling processing based on comparison of levels of a ramp signal RMP and a pixel signal input from a column signal line. For example, each of the plurality of correlated double sampling circuits CDS1 400-1 through CDSN 400-N may be provided as a comparator circuit. In detail, if a pixel signal in each of a reset phase interval and a signal phase interval is applied to a first input terminal of a comparator circuit and a ramp signal RMP is applied to a second input terminal of the comparator circuit, the comparator circuit outputs a comparator output signal showing the comparison result in each of the reset phase interval and the signal phase interval.

In the correlated double sampling circuits CDS1 400-1 through CDSN 400-N, a delay may occur in the process of comparing a ramp signal RMP and a pixel signal. This delay may be canceled by controlling the level of a pixel output signal in the level adjusting circuit block 300A, as explained below in detail.

The analog-to-digital conversion circuit block 500 includes a plurality of analog-to-digital circuits ADC1 500-1 through ADCN 500-N. Each of the plurality of analog-to-digital circuits ADC1 500-1 through ADCN 500-N receives an input of a comparator output signal of the correlated double sampling circuit connected to a corresponding column signal line.

Each of the plurality of analog-to-digital circuits ADC1 500-1 through ADCN 500-N calculates a first code value indicating a first interval width from a point in time where a ramp signal RMP in a reset phase interval starts to fall, to a point in time where a pulse of a comparator output signal is generated. Each of the analog-to-digital circuits ADC1 500-1 through ADCN 500-1 calculates a second code value indicating a second interval width from a point in time where a ramp signal RMP in a signal phase interval starts to fall, to a point in time where a pulse of a comparator output signal is generated. Each of the analog-to-digital circuits ADC1 500-1 through ADCN 500-1 calculates the difference between the first and second code values, and generates digital pixel data of a corresponding pixel. For example, by using a counter, the first and second code values corresponding to the first and second interval widths, respectively, may be obtained.

Figure 2:
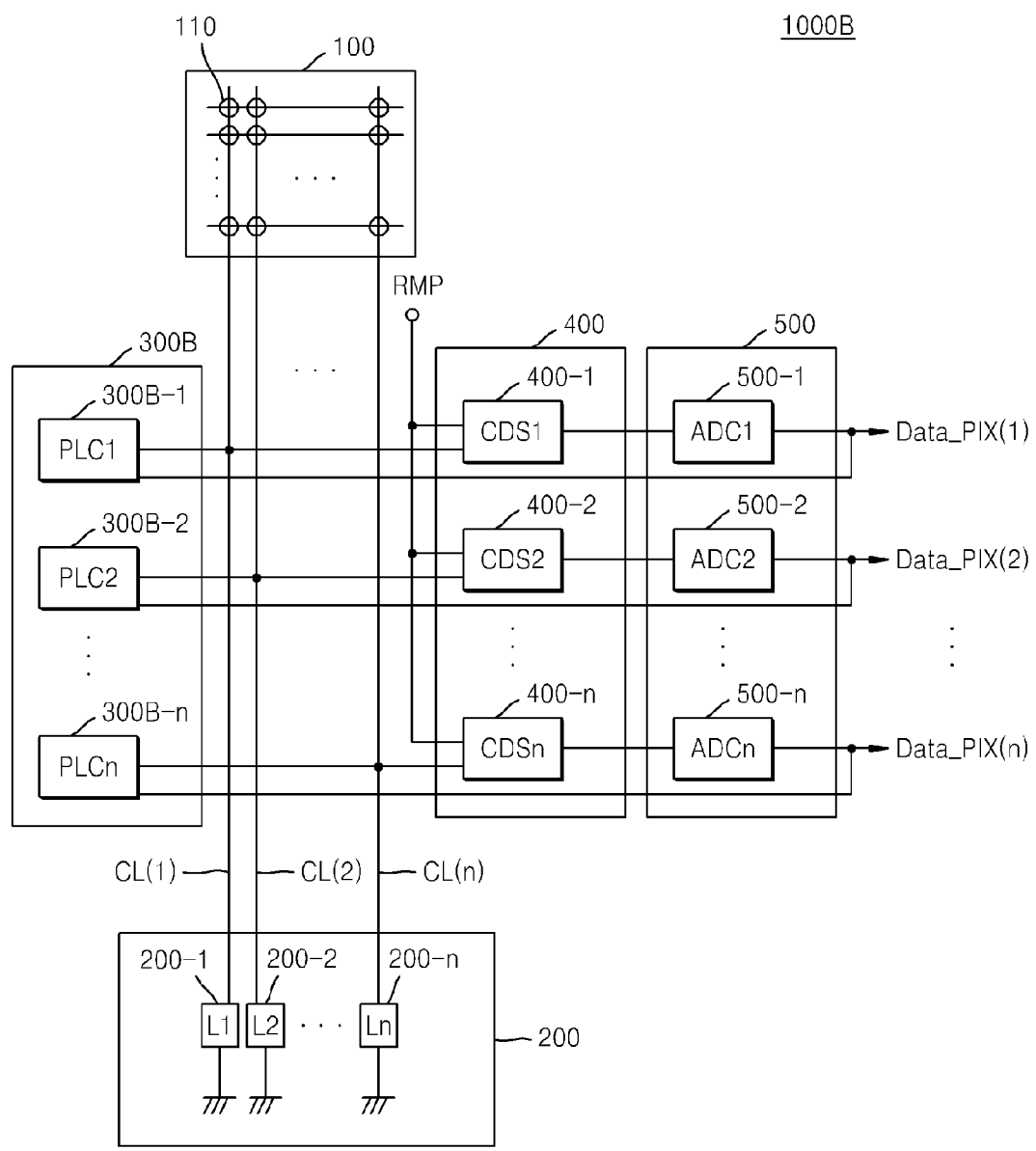
FIG. 2 is a schematic diagram of an image sensor according to at least one example embodiment.

FIG. 2 is a schematic diagram of an image sensor 1000B according to at least one example embodiment. As shown in FIG. 2, the image sensor 1000B includes a pixel array 100, a load circuit block 200, a level adjusting circuit block 300B, a correlated double sampling circuit block 400, and an analog-to-digital conversion circuit block 500.

As the pixel array 100, the load circuit block 200, the correlated double sampling circuit block 400 and the analog-to-digital conversion circuit block 500 are described above with reference to FIG. 1, a repeated description thereof is omitted.

The image sensor 1000B shown in FIG. 2 is different from the image sensor 1000A shown in FIG. 1 in the composition of the level adjusting circuit block 300B.

The level adjusting circuit block 300A shown in FIG. 1 adjusts the voltage of a pixel signal based on an initially set correction target value. The level adjusting circuit block 300B shown in FIG. 2 adjusts the voltage of a pixel signal based on digital pixel data generated in the analog-to-digital conversion circuit 500-i using an optical signal of a test pattern sensed by pixel sensors 110.

The level adjusting circuit block 300B will now be explained.

The level adjusting circuit block 300B includes a plurality of level adjusting circuits PLC1 300B-1 through PLCN 300B-N. As shown in FIG. 2, one level adjusting circuit is connected to each column signal line. Each of the plurality of level adjusting circuits PLC1 300B-1 through PLCN 300B-N controls the voltage level of a pixel signal output to the column signal line. For example, each of the plurality of level adjusting circuits PLC1 300B-1 through PLCN 300B-N may determine a correction target value based on digital pixel data fed back from the analog-to-digital conversion circuit 500-i. The digital pixel data fed back from the analog-to-digital conversion circuit 500-I may be from an optical signal of a test pattern sensed by pixel sensors 110. For example, when the image sensor 1000B is initialized, an optical signal of a test pattern may be applied. For example, the optical signal of a test pattern may include an optical signal of a pattern detected in the pixel array 100 when the shutter of the image sensor 1000B is closed. That is, the optical signal of a test pattern may be an optical signal of a dark pattern in which light is obscured or blocked out.

For example, if an optical signal of a test pattern is input, a correction target value may be determined based on the difference between digital pixel data fed back from the analog-to-digital conversion circuit 500-i and target digital pixel data corresponding to the test pattern. The target digital pixel data corresponding to the test pattern may be set to an initial value. The initial value may be selected based on empirical data or user input. For example, when the test pattern is a dark pattern, target digital pixel data may be set to '0'.

The level adjusting circuit block 300B applies a correction target value determined based on digital pixel data fed back from the analog-to-digital conversion circuit 500-i, and thus adjusts the voltage level of a pixel signal output to the column signal line in a normal mode. For example, during any one of a reset phase interval and a signal phase interval in a correlated double sampling operation interval, the level adjusting block 300B adjusts the voltage level of a pixel signal corresponding to a correction target value.

Through this adjustment of the voltage level of a pixel signal corresponding to a correction target value, an offset occurring in each column signal line may be corrected.

Figure 3A:
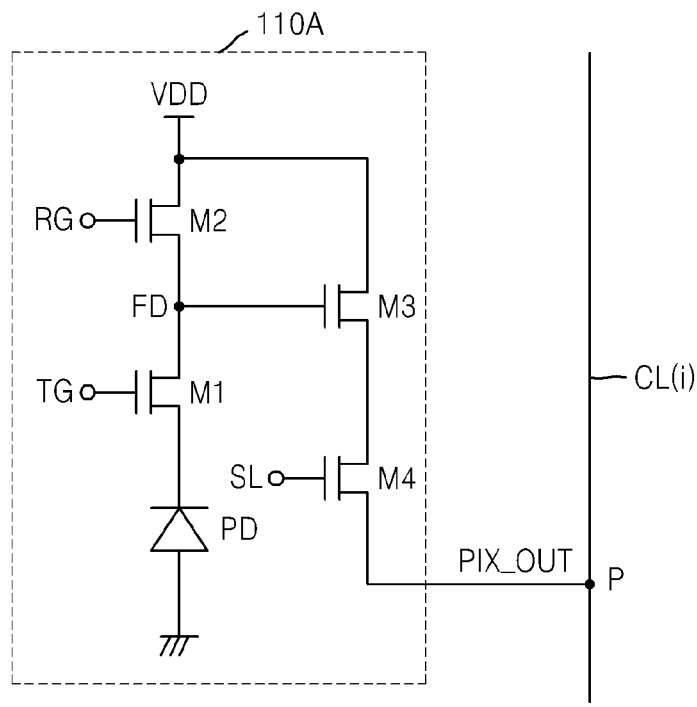
FIG. 3A is a circuit diagram of an example of a pixel sensor illustrated in FIGS. 1 and 2.
Figure 3B:
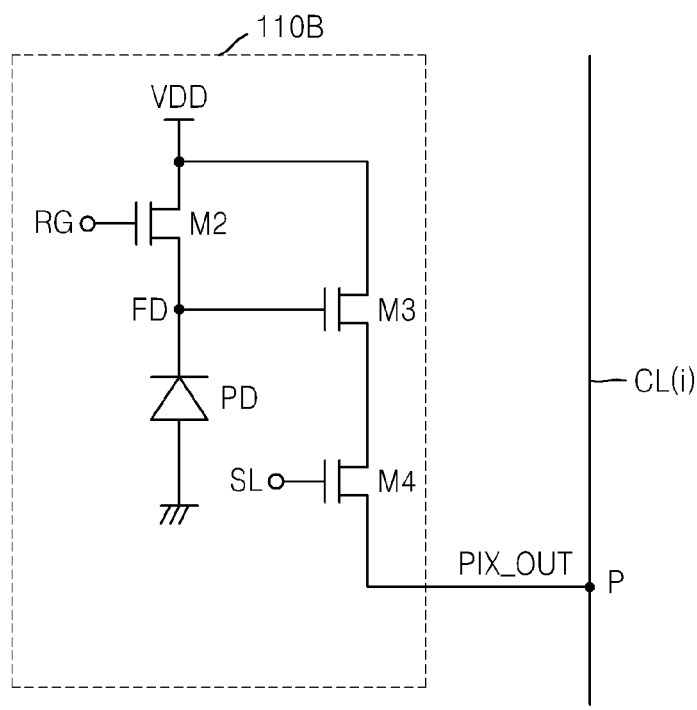
FIG. 3B is a circuit diagram of another example of the pixel sensor illustrated in FIGS. 1 and 2.
Figure 3C:
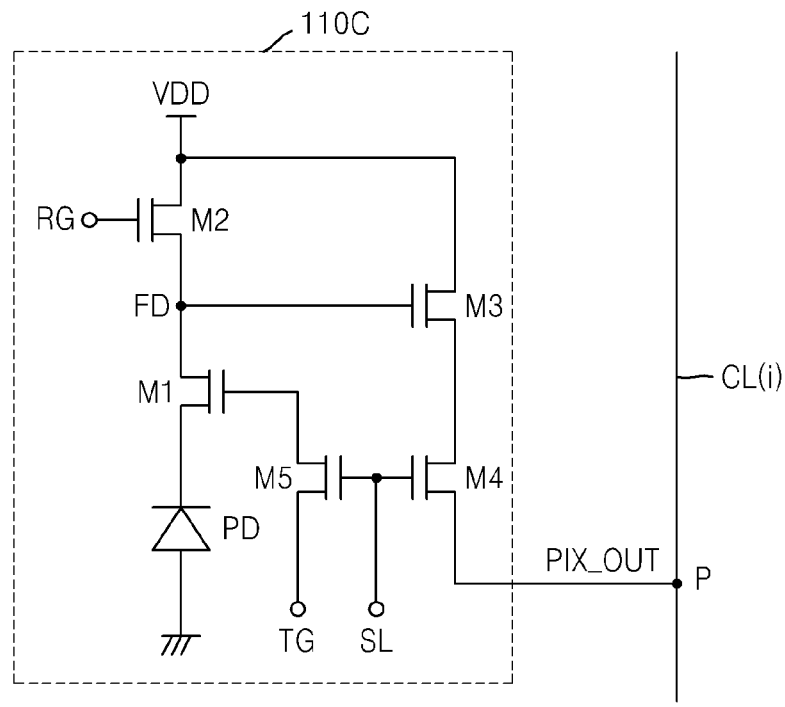
FIG. 3C is a circuit diagram of another example of the pixel sensor illustrated in FIGS. 1 and 2.

FIGS. 3A through 3C are circuit diagrams showing various example embodiments of the pixel sensors 110 forming the pixel array 100 shown in FIGS. 1 and 2.

As shown in FIG. 3A, a pixel sensor 110A according to at least one example embodiment may include one photoelectric conversion device PD and four transistors M1 through M4.

The photoelectric conversion device PD is a photo-detective device and may be a photodiode, a phototransistor, a photogate, or a pinned photodiode.

The photoelectric conversion device PD is connected between a floating diffusion node FD and a ground terminal, and generates an electric charge corresponding to an optical signal of incident light.

The transistor M2 is connected between a supply voltage VDD terminal and a floating diffusion node FD. In response to a driving signal RG, transistor M2 allows electric charges stored in the floating diffusion node FD to be discharged.

The transistor M1 is connected between an output terminal of the photoelectric conversion device PD and the floating diffusion node FD. In response to a driving signal TG, transistor M1 passes an optical charge generated in the photoelectric conversion device PD to the floating diffusion node FD.

The transistor M3 operates as a source follower amplifier, and in response to electric charges charged in the floating diffusion node FD, performs a buffering operation.

A drain terminal of the transistor M4 is connected to a source terminal of the transistor M3, and a source terminal of the transistor M4 is connected to a node P of a column signal line CL(i). A driving signal SL is applied to a gate terminal of the transistor M4. Here, the node P indicates an output node of a pixel sensor.

Accordingly, in response to the driving signal SL, the transistor M4 passes a pixel signal PIX_OUT output from the transistor M3 to the column signal line CL(i).

Next, as shown in FIG. 3B, a pixel sensor 110B according to at least one example embodiment may include one photoelectric conversion device PD and three transistors M2 through M4.

Referring to FIGS. 3A and 3B, the pixel sensor 110B shown in FIG. 3B has a structure in which the transistor M1 performing a transmission transistor role is omitted, as compared to the pixel sensor 110A shown in FIG. 3A.

Next, as shown in FIG. 3C, a pixel sensor 110C according to at least one example embodiment may include one photoelectric conversion device PD and 5 transistors M1 through M5.

Referring to FIG. 3C, compared to the pixel sensor 110A shown in FIG. 3A, the transistor M5 is added. In detail, a driving signal TG for controlling the operation of the transistor M1 performing a transmission transistor role is provided to the gate of the transistor M1 through the transistor M5. Transistor M5 is turned on or off in response to a driving signal SL.

Referring to FIGS. 3A through 3C, each of the pixel sensors 110A through 110C transmits a pixel signal PIX_OUT to the column signal line CL(i) through the transistor M3, which operates as a source follower amplifier.

Figure 4:
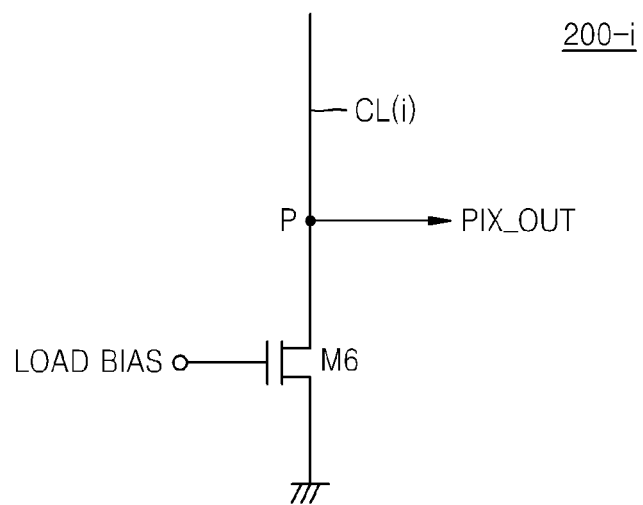
FIG. 4 is a circuit diagram of an example of a load circuit illustrated in FIGS. 1 and 2.

FIG. 4 is a circuit diagram of an example of a load circuit 200-i illustrated in FIGS. 1 and 2.

Referring to FIG. 4, the load circuit 200-i may be provided as a transistor M6. For example, the transistor M6 may be provided as an n-type metal-oxide-semiconductor (NMOS) transistor. In detail, a drain terminal of the transistor M6 is connected to a node P, a source terminal of the transistor M6 is connected to a ground terminal, and a load bias voltage (or current) is applied to a gate terminal of the transistor M6. According to the load bias voltage (or current), the drain-source current of the transistor M6 varies.

That is, according to the load bias voltage (or current), the load value between the node P and the ground varies. Accordingly, the transistor M6 operates as an active load. For reference, the load circuit 200-i may be expressed as a current source indicating the drain-source current of the transistor M6 corresponding to the load bias voltage (or current).

Figure 5:
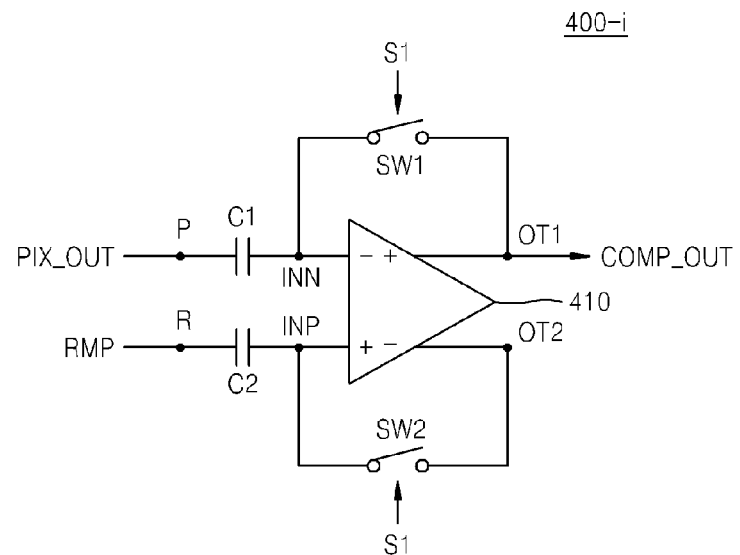
FIG. 5 is a circuit diagram of an example of a correlated double sampling circuit illustrated in FIGS. 1 and 2.

FIG. 5 is a circuit diagram of an example of a correlated double sampling circuit 400-i illustrated in FIGS. 1 and 2.

Referring to FIG. 5, the correlated double sampling circuit 400-i may include a comparator circuit. The correlated double sampling circuit 400-i includes a comparator 410 and peripheral circuit.

The peripheral circuit includes a pair of capacitors C1 and C2 and a pair of switches SW1 and SW2.

The capacitor C1 is connected between a node P, to which a pixel signal PIX_OUT is input, and a first input terminal INN of the comparator 410. The capacitor C2 is connected between a node R, to which a ramp signal RMP is input, and a second input terminal INP of the comparator 410.

The switch SW1 is connected between the first input terminal INN and a first output terminal OT1 of the comparator 410, and the switch SW2 is connected between the second input terminal INP and a second output terminal OT2 of the comparator 410. For example, the comparator 410 may output an output signal COMP_OUT to the first output terminal OT1. For example, the switches SW1 and SW2 may be turned on and/or off at the same time by a switching control signal 51. The switching control signal 51 may be generated in a timing controller of an image sensor as explained below.

Figure 6:
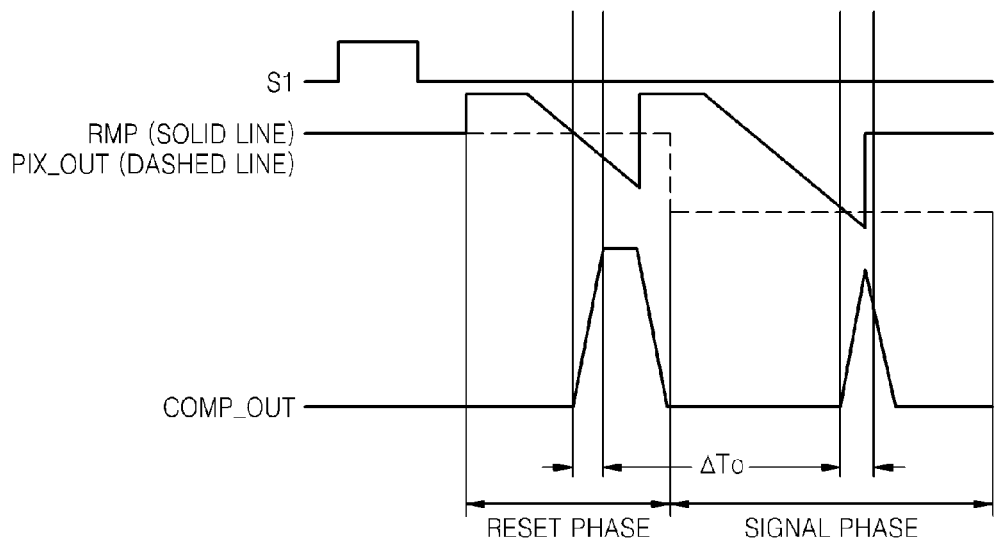
FIG. 6 shows waveforms of major signals occurring when control of a pixel output level is not performed in an image sensor according to at least one example embodiment.

For reference, the waveforms of major signals in the correlated double sampling circuit 400-i are shown in FIG. 6. In FIG. 6, it is assumed that control of a pixel output level by the level adjusting circuit block 300A and 300B is not performed in the image sensors 1000A and 1000B of FIGS. 1 and 2

FIG. 6 shows waveforms of major signals occurring when control of a pixel output level is not performed in an image sensor according to at least one example embodiment.

FIG. 6 shows that an error occurs by a comparison decision delay in a correlated double sampling circuit 400-i. That is, in a signal phase interval of a correlated double sampling interval, a distortion of the output signal COMP_OUT occurs according to a comparison decision delay ΔTo. This distortion of the comparator output signal COMP_OUT may cause an error when a digital pixel signal is generated by correlated double sampling processing.

FIG. 6 illustrates one disadvantage where there is a limit in reducing a 1H time in an image sensor by the comparison decision delay of the correlated double sampling circuit 400-i as described above. Here, the 1H time indicates a time for generating digital pixel data by correlated double sampling processing of pixel signals PIX_OUT output from respective pixel sensors of one row of a pixel array 100.

Figure 7:
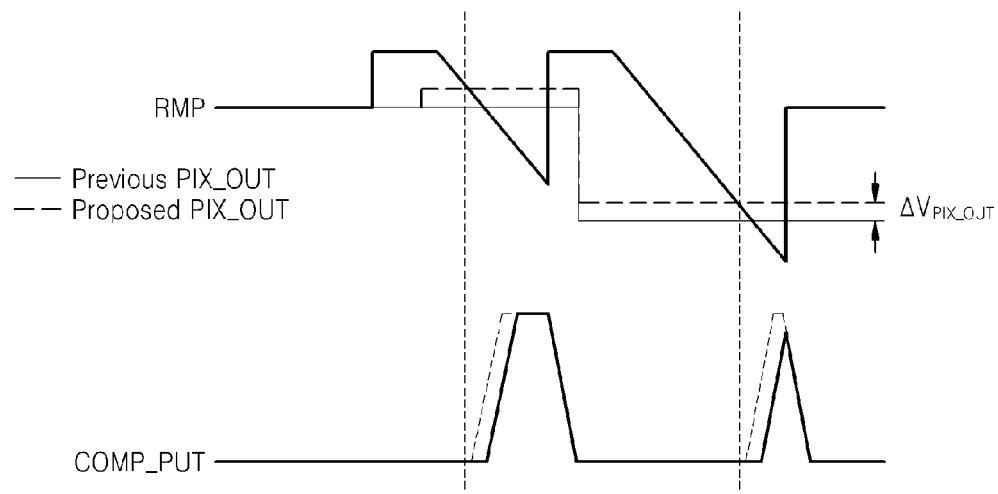
FIG. 7 shows waveforms of major signals of a correlated double sampling circuit to explain a method of controlling a pixel output level, according to at least one example embodiment.

FIG. 7 shows waveforms of signals of a correlated double sampling circuit to explain a method of controlling a pixel output level, according to at least one example embodiment.

Referring to FIG. 7, according to a method of controlling a pixel output level of an example embodiment, the intersection of a ramp signal RMP and a pixel signal PIX_OUT is shifted in the direction to a higher voltage in order to mitigate (or alternatively, prevent) an error caused by a comparison decision delay of a correlated double sampling circuit.

As shown in FIG. 7, if the intersection of the ramp signal RMP and the pixel signal PIX_OUT is shifted to a higher voltage, the distortion of a comparator output signal COMP_OUT in a signal phase interval is compensated for, and thus, the comparison decision delay of the correlated double sampling circuit decreases.

Figure 8:
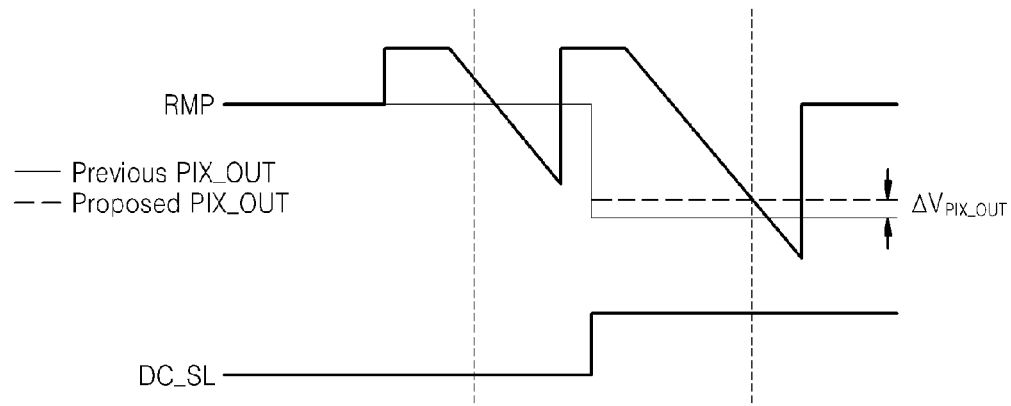
FIG. 8 shows waveforms of major signals of a correlated double sampling circuit to explain a method of controlling a pixel output level, according to at least one example embodiment.

FIG. 8 shows waveforms of signals of a correlated double sampling circuit to explain a method of controlling a pixel output level, according to at least one other example embodiment.

Referring to FIG. 8, the voltage level of a pixel signal PIX_OUT is adjusted in any one of a reset phase interval and a signal phase interval in a correlated double sampling operation interval. The voltage level of the pixel signal PIX_OUT may be adjusted based on digital pixel data fed back from an analog-to-digital conversion circuit 500-i in order to correct an offset voltage occurring in each column signal line. The digital pixel data fed back may be based on an optical signal of a test pattern input to the pixel sensor 110.

FIG. 8 shows an example of adjusting the voltage level of a pixel signal PIX_OUT in a signal phase interval of a correlated double sampling operation interval. As another example, the voltage level of a pixel signal PIX_OUT may be adjusted in a reset phase interval of a correlated double sampling operation interval.

Figure 9:
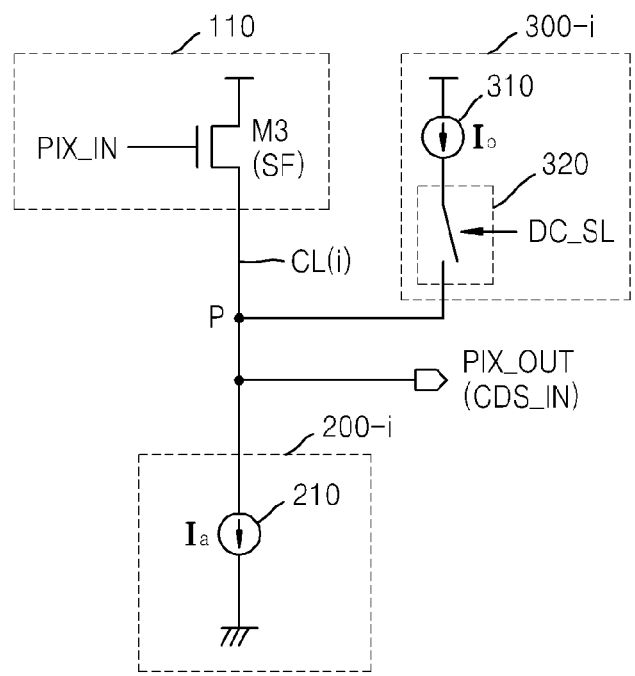
FIG. 9 is a circuit diagram of an apparatus for controlling a pixel output level, according to at least one example embodiment.

FIG. 9 is a circuit diagram of an apparatus for controlling a pixel output level 200, according to at least one example embodiment.

As shown in FIG. 9, the apparatus for controlling a pixel output level 2000 includes a column signal line CL(i) connected to an output node of a pixel sensor 110, a load circuit 200-i, and a level adjusting circuit 300-i.

Referring to FIG. 9, for circuit analysis, the pixel sensor 110 is equivalently represented by only the transistor M3 which is a source follower (SF) amplifier transistor passing a pixel signal PIX_IN of a floating diffusion node FD to a node P of the column signal line CL(i) in the pixel sensor circuits shown in FIGS. 3A through 3C. The pixel signal PIX_OUT detected in the column signal line CL(i) is an input signal CDS_IN of a correlated double sampling circuit.

For reference, the transistor M4 in the pixel sensor circuits shown in FIGS. 3A through 3C is a transistor performing a switching operation. Accordingly, when the transistor M4 is turned on, the transistor M4 acts as a short circuit, and thus, it is omitted in FIG. 9.

The load circuit 200-i is represented equivalently as a current source 210 in which a current Ia flows.

The level adjusting circuit 300-i is represented equivalently as a current source 310 in which a current Ib flows, and a switching unit 320.

In the circuit shown in FIG. 9, when the switching unit 320 is turned off, the current Ia is expressed as the following Equation 1:

$$I_a = \frac{1}{2}\mu_n C_{ox} \frac{W_{SF}}{L_{SF}}(V_{PIX\_IN} - V_{PIX\_OUT} - V_{th})^2 \quad (1)$$

Here, $\mu_n$ denotes a mobility constant, $C_{ox}$ denotes an oxide capacitance, $W_{SF}$ denotes a channel width, $L_{SF}$ denotes a channel length, and $V_{th}$ denotes the threshold voltage of the transistor M3. $V_{PIX\_OUT}$ denotes a correlated double sampling input voltage when the switching unit 320 is turned off.

Equation 1 may be expressed as the following Equation 2:

$$V_{PIX\_OUT} - V_{PIX\_IN} = \sqrt{\frac{2I_a}{\mu_n C_{ox}} \frac{L_{SF}}{W_{SF}}} + V_{th} \quad (2)$$

Next, in the circuit of FIG. 9, when the switching unit 320 is turned on, a current (Ia-Ib) is expressed as the following Equation 3:

$$I_a - I_b = \frac{1}{2}\mu_n C_{ox} \frac{W_{SF}}{L_{SF}}(V_{PIX\_IN} - V'_{PIX\_OUT} - V_{th})^2 \quad (3)$$

Here, $V_{PIX\_OUT}'$ denotes the correlated double sampling input voltage when the switching unit 320 is turned on.

Equation 3 may be expressed as the following Equation 4:

$$V'_{PIX\_OUT} - V_{PIX\_IN} = \sqrt{\frac{2(I_a - I_b)}{\mu_n C_{ox}} \frac{L_{SF}}{W_{SF}}} + V_{th} \quad (4)$$

Accordingly, the difference voltage $\Delta V_{PIX\_OUT}$ of $V_{PIX\_OUT}'$ and $V_{PIX\_OUT}$ is expressed as the following Equation 5:

$$\Delta V_{PIX\_OUT} = \text{Vpix\_out}' - \text{Vpix\_out} \quad (5)$$

$$= \sqrt{\frac{2I_a}{\mu_n C_{ox}} \frac{L_{SF}}{W_{SF}}} - \sqrt{\frac{2(I_a - I_b)}{\mu_n C_{ox}} \frac{L_{SF}}{W_{SF}}}$$

According to Equation 5, it should be understood that the adjustment level $\Delta V_{PIX\_OUT}$ of a pixel voltage may be adjusted by the current Ib.

Figure 10:
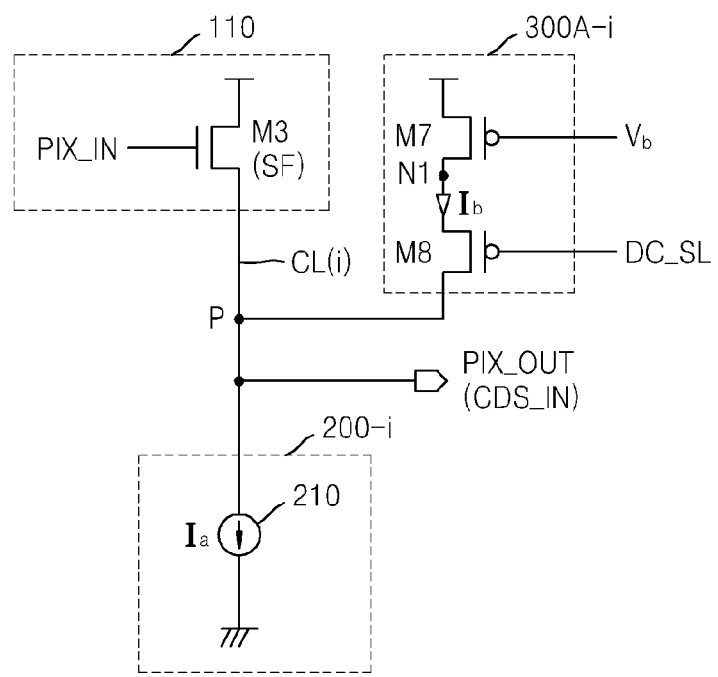
FIG. 10 shows an example of a level adjusting circuit illustrated in FIG. 9.

FIG. 10 shows an example of the level adjusting circuit 300-i illustrated in FIG. 9.

Referring to FIG. 10, an apparatus for controlling a pixel output level 2000A includes a column signal line CL(i) connected to an output node of a pixel sensor 110, a load circuit 200-i, and a level adjusting circuit 300A-i. The level adjusting circuit 300A-i may include a plurality of transistors M7 and M8. For example, the transistors M7 and M8 may include p-type metal-oxide-semiconductor (PMOS) transistors.

As shown in FIG. 10, a source terminal of the transistor M7 is connected to a power supply terminal, and a drain terminal is connected to a node N1. A bias voltage Vb is applied to a gate terminal. A source terminal of the transistor M8 is connected to the node N1, and a drain terminal is connected to a node P. A switching control signal DC_SL is applied to a gate terminal.

The source-drain current Ib varies according to the bias voltage Vb applied to the gate terminal of the transistor M7. Accordingly, by adjusting the bias voltage Vb, $\Delta V_{PIX\_OUT}$, which is an adjustment level of a pixel voltage, may be changed.

When the switching control signal DC_SL is a logic state "low", the transistor M8 is turned on, and when it is a logic state "high", the transistor M8 is turned off.

Accordingly, if the logic state of the switching control signal DC_SL is set to "low" in a correlated double sampling operation interval, the voltage level of a pixel signal PIX_OUT can be increased by a correction target value $\Delta V_{PIX\_OUT}$, as shown in FIG. 7. That is, the intersection of the ramp signal RMP and the pixel signal PIX_OUT may be shifted to a higher voltage.

For example, a correction target value $\Delta V_{PIX\_OUT}$ may be set to adjust the voltage level of a pixel signal PIX_OUT in a range between a maximum voltage level and a minimum voltage level of a ramp signal RMP which is used in correlated double sampling processing.

Figure 11:
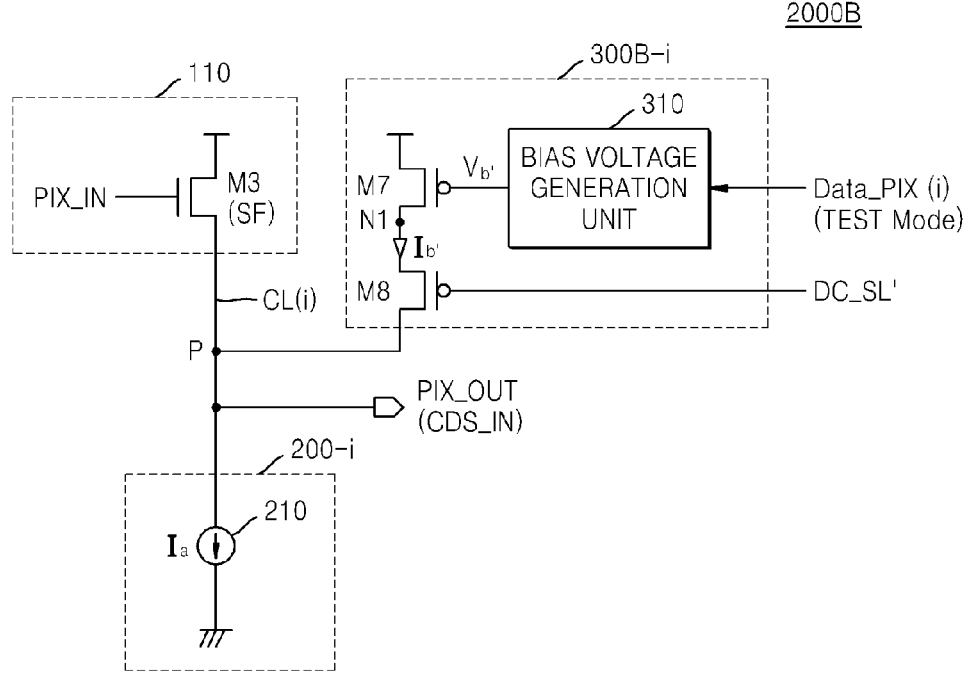
FIG. 11 shows another example of the level adjusting circuit illustrated in FIG. 9.

FIG. 11 shows another example of the level adjusting circuit 300-i illustrated in FIG. 9.

Referring to FIG. 11, an apparatus for controlling a pixel output level 2000B includes a column signal line CL(i) connected to an output node of a pixel sensor 110, a load circuit 200-i, and a level adjusting circuit 300B-i. The level adjusting circuit 300B-i includes a plurality of transistors M7 and M8 and a bias voltage generation unit 310. For example, the transistors M7 and M8 may respectively include PMOS transistors.

The bias voltage generation unit 310 determines a bias voltage Vb' based on digital pixel data Data_PIX(I) fed back from the analog-to-digital circuit 500-i shown in FIG. 2. For example, the bias voltage Vb' may be determined based on digital pixel data Data_PIX(i) fed back from the analog-to-digital conversion circuit 500. The digital pixel data Data_PIX(i) may be based on an optical signal of a test pattern sensed by pixel sensor 110. For example, the optical signal of the test pattern may be sensed by the pixel sensor 110 when an image sensor is initialized.

For example, referring to FIG. 2, the optical signal of the test pattern may include an optical signal of a pattern detected in the pixel array 100 when the shutter of the image sensor 1000B is closed. That is, the optical signal of the test pattern may be an optical signal of a dark pattern in which light is obscured or blocked out.

For example, when an optical signal of a test pattern is input to pixel array 100, the bias voltage generation unit 310 may determine a correction target value $\Delta V_{PIX\_OUT}$ based on the difference between digital pixel data Data_PIX(i) fed back from the analog-to-digital conversion circuit 500-i and target digital pixel data corresponding to the test pattern. The target digital pixel data corresponding to the test pattern may be set with an initial value. For example, when the test pattern is a dark pattern, target digital pixel data may be set to '0'.

The bias voltage generation unit 310 generates a bias voltage Vb' corresponding to the determined correction target value $\Delta V_{PIX\_OUT}$. That is, the bias voltage Vb' is generated in order to adjust the level of a pixel signal PIX_OUT by the correction target value $\Delta V_{PIX\_OUT}$.

The bias voltage generation unit 310 outputs a bias voltage Vb', which is determined based on a test pattern in order to adjust the voltage level of a pixel signal output to a column signal line in a normal mode.

As shown in FIG. 11, a source terminal of the transistor M7 is connected to a power supply terminal, and a drain terminal is connected to a node N1, and a bias voltage Vb' output from the bias voltage generation unit 310 is applied to a gate terminal of the transistor M7. A source terminal of the transistor M8 is connected to the node N1, and a drain terminal is connected to a node P, and a switching control signal DC_SL' is applied to a gate terminal of the transistor M8.

The source-drain current Ib' varies according to the bias voltage Vb's applied to the gate terminal of the transistor M7. Accordingly, based on a correction target value $\Delta V_{PIX\_OUT}$, which is determined based on an optical signal of a test pattern, the voltage level of a pixel signal in a normal mode may be adjusted.

The source terminal of the transistor M8 is connected to the node N1, and the drain terminal of the transistor M8 is connected to the node P, and the switching control signal DC_SL' is applied to a gate terminal of the transistor M8. For example, the switching control signal DS_SL' may turn on the transistor M8 in any one of a reset phase interval and a signal phase interval.

Accordingly, by using the level adjusting circuit 300B-i, an offset voltage occurring in each column signal line may be corrected.

Figure 12:
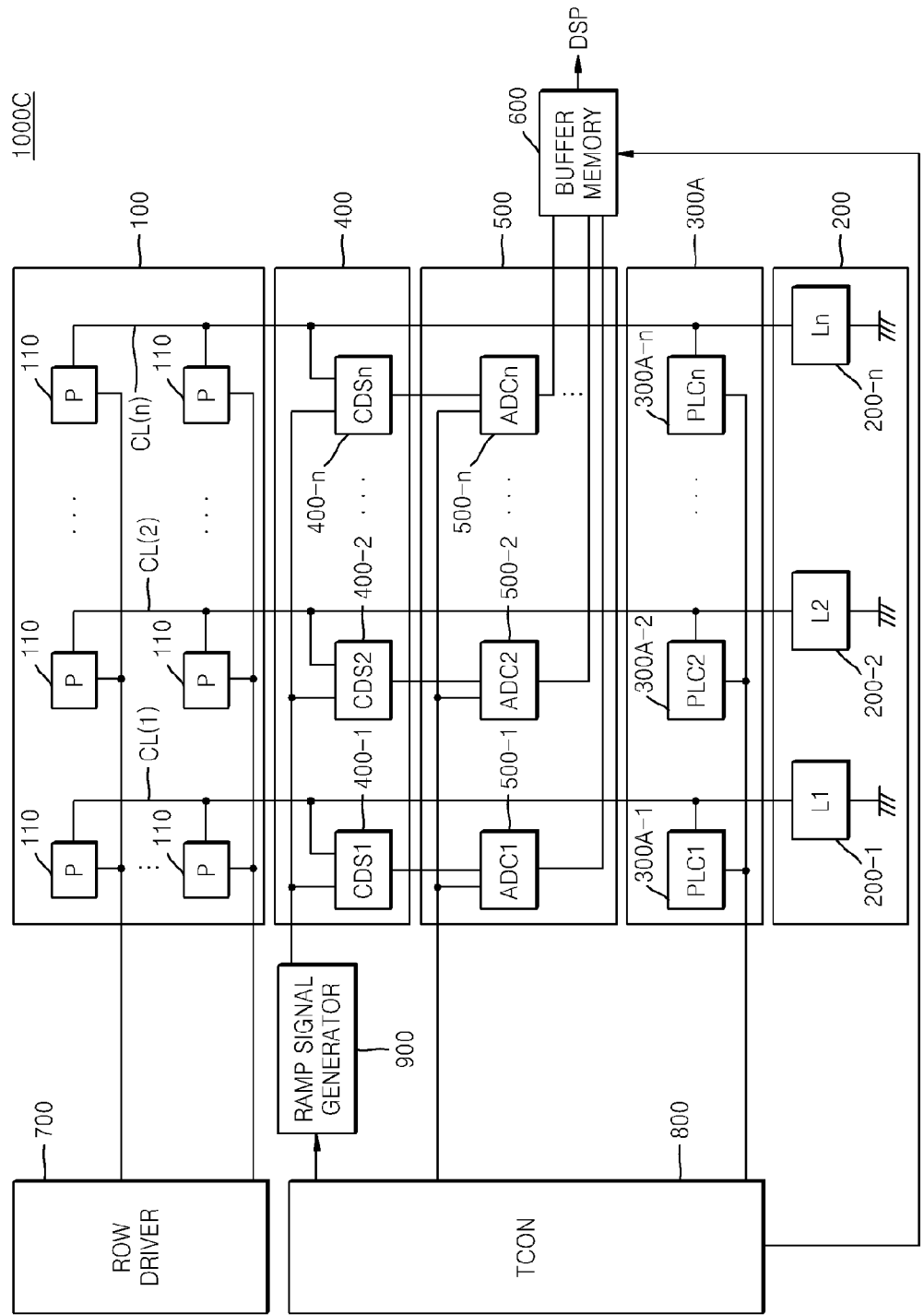
FIG. 12 shows a detailed structure of an image sensor according to at least one example embodiment.

FIG. 12 shows a detailed structure of an image sensor 1000C according to at least one example embodiment.

As shown in FIG. 12, the image sensor 1000C includes a pixel array 100, a load circuit block 200, a level adjusting circuit block 300A, a correlated double sampling circuit block 400, an analog-to-digital conversion circuit block 500, a buffer memory 600, a row driver 700, a timing controller TCON 800, and a ramp signal generator 900.

The pixel array 100 includes a plurality of pixel sensors 110. The pixel array 100 has a structure in which the plurality of pixel sensors 110 in the form of a matrix are connected to each of a plurality of column signal lines CL(1) through CL(N) (N is a natural number equal to or greater than 2). The pixel sensor 110 is described in detail with reference to FIGS. 1 and 3A through 3C, and therefore, a repeated description thereof is omitted.

The load circuit block 200 includes a plurality of load circuits L1 200-1 through LN 200-N, and in each column signal line, a single common load circuit is provided.

The level adjusting circuit block 300A includes a plurality of level adjusting circuits PLC1 300A-1 through PLCN 300A-N. and one level adjusting circuit is connected to each of the column signal line. Each of the plurality of level adjusting circuits PLC1 300A-1 through PLCN 300A-N may control the voltage level of a pixel signal output to the column signal line based on an initially set correction target value. For example, a correction target value may be determined based on a delay quantity in a process of generating a comparator output signal in a correlated double sampling circuit. The operation of the level adjusting circuit block 300A is explained in detail with reference to FIGS. 1, 9, and 10, and thus, a repeated description thereof is omitted.

Figure 13:
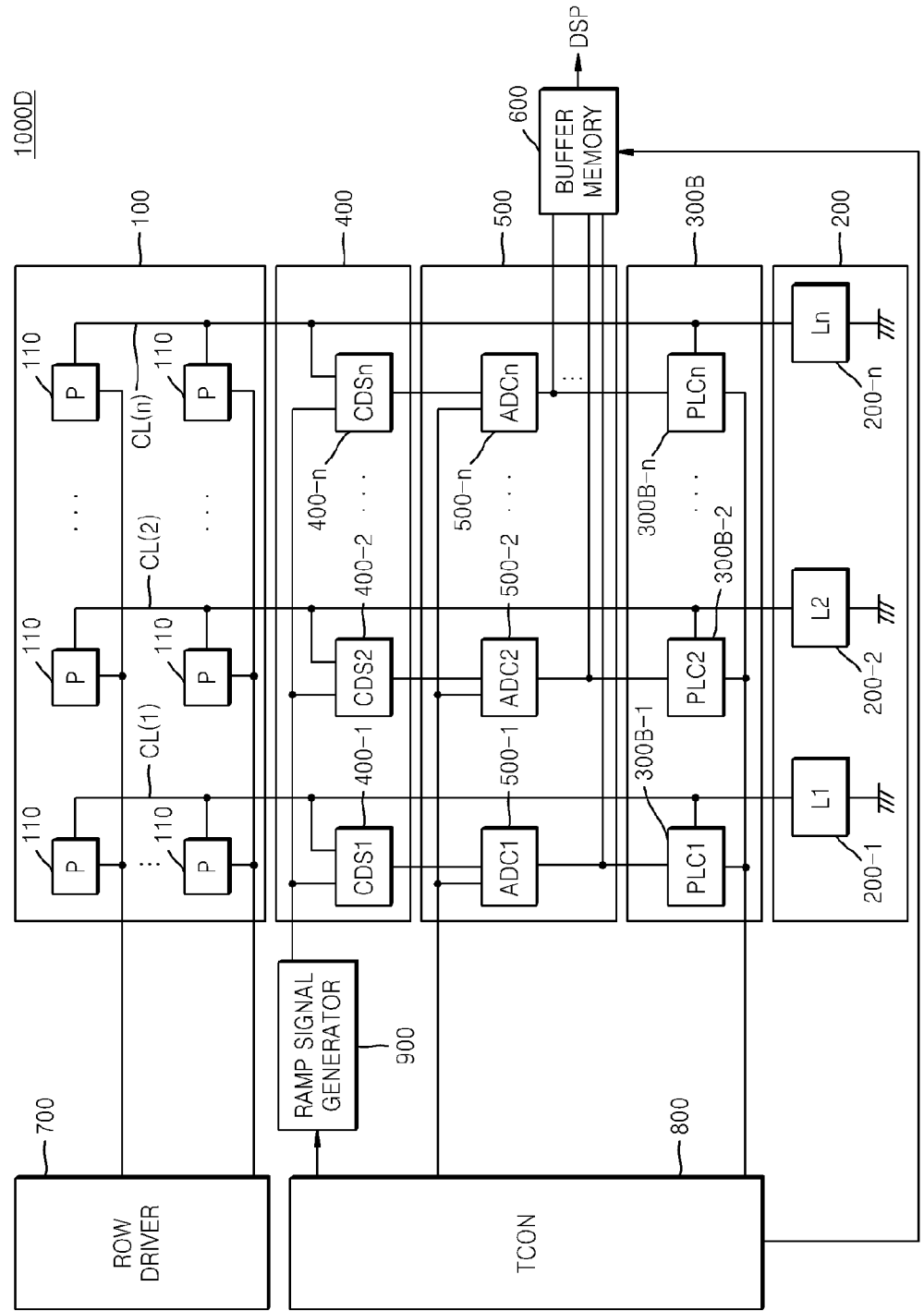
FIG. 13 shows a detailed structure of an image sensor according to at least one example embodiment.

FIG. 13 shows a detailed structure of an image sensor 1000D according to at least one example embodiment.

As shown in FIG. 13, the image sensor 1000D includes a pixel array 100, a load circuit block 200, a level adjusting circuit block 300B, a correlated double sampling circuit block 400, an analog-to-digital conversion circuit block 500, a buffer memory 600, a row driver 700, a timing controller TCON 800, and a ramp signal generator 900.

Compared to the image sensor 1000C shown in FIG. 12, the image sensor 1000D shown in FIG. 13 has a different level adjusting circuit block 300B and other components are the same. A repeated description of the same components as those in FIG. 12 is omitted.

For reference, the timing controller TCON 800 generates a switching control signal DC_SL' for the operation of the level adjusting circuit block 300B.

The level adjusting circuit block 300B includes a plurality of level adjusting circuits PLC1 300B-1 through PLCN 300B-N, and one level adjusting circuit is connected to each column signal line. Each of the plurality of level adjusting circuits PLC1 300B-1 through PLCN 300B-N controls the voltage level of a pixel signal output to the column signal line. For example, each of the plurality of level adjusting circuits PLC1 300B-1 through PLCN 300B-N may determine a correction target value based on digital pixel data fed back from the analog-to-digital conversion circuit 500-1. The digital pixel data fed back may be based on an optical signal of a test pattern sensed by the pixel sensors 110. For example, when the image sensor 1000D is initialized, the test pattern may be sensed by pixel sensors 110. For example, the optical signal of a test pattern may include an optical signal of a pattern detected in the pixel array 100 when the shutter of the image sensor 1000D is closed. That is, the optical signal of a test pattern may be an optical signal of a dark pattern in which light is obscured or blocked out. The operation of the level adjusting circuit block 300B is explained in detail with reference to FIGS. 2, 9, and 11, and thus, a repeated description thereof is omitted.

Figure 14:
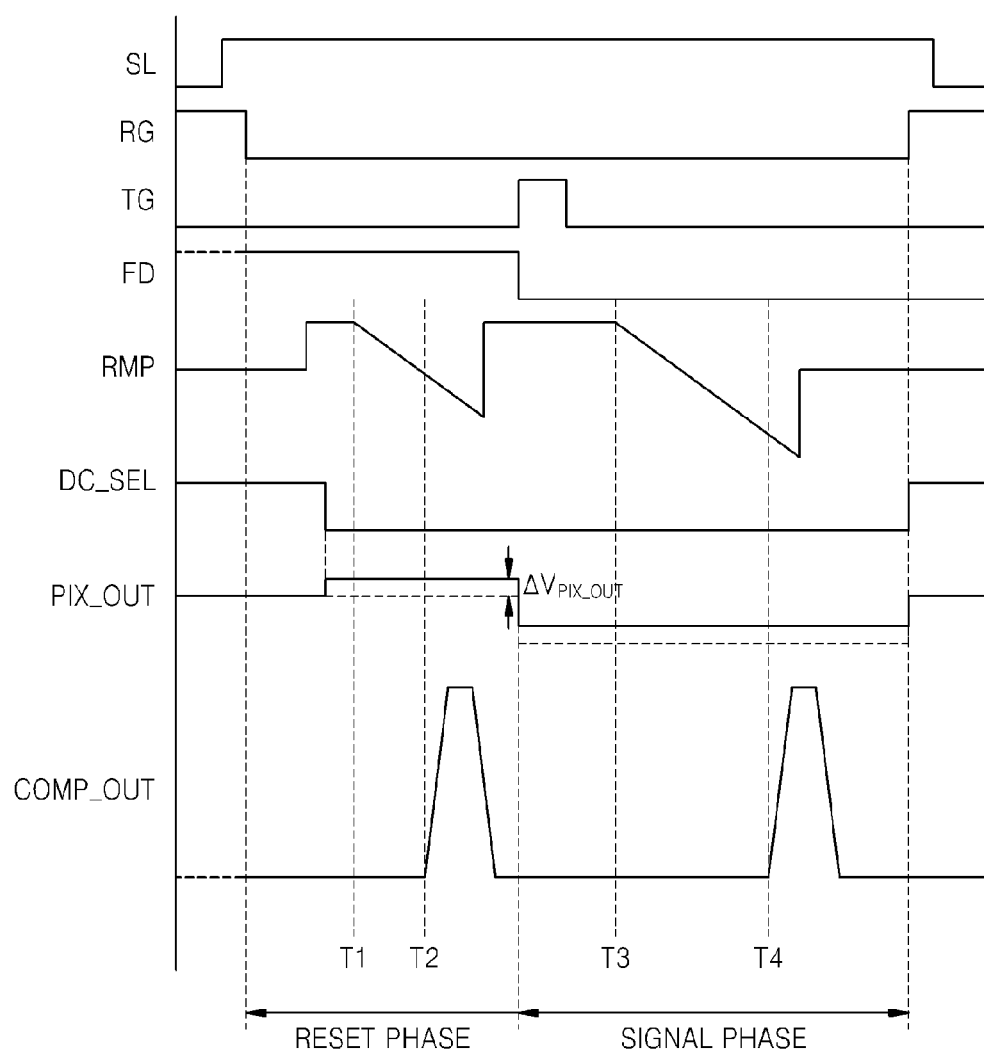
FIG. 14 shows waveforms of major signals in an image sensor according to at least one example embodiment.

Referring to FIG. 14, it is shown that the voltage level of a pixel signal PIX_OUT raises by $\Delta V_{PIX\_OUT}$ from a dashed line to a solid line in a reset phase interval and a signal phase interval, respectively, according to the level adjustment of the pixel signal PIX_OUT output to each column signal line by the level adjusting circuit block 300A.

The timing controller 800 generates control signals for selecting pixel sensors 110 to detect an optical signal in the pixel array 100 or for outputting detected optical signals. The timing controller 800 controls the timing of an occurrence of a ramp signal required for performing a correlated double sampling process, and controls the output of data stored in the buffer memory 600. The timing controller 800 generates a switching control signal DC_SL required for controlling the level adjusting circuit block 300A.

In response to control signals generated in the timing controller 800, the row driver 700 outputs to the pixel array 100, a plurality of driving signals required for controlling photoelectric conversion operations of a plurality of pixel sensors arranged in a row direction. Here, as examples of the plurality of driving signals may include driving signals RG, TG, and SL, as shown in FIG. 14.

In response to control signals generated in the timing controller 800, the ramp signal generator 900 generates a ramp signal RMP and outputs the ramp signal RMP to the correlated double sampling circuit block 400. As shown in FIG. 14, for correlated double sampling processing, the ramp signal generator 900 generates a signal in a ramp waveform before a driving signal TG pulse is generated, and generates a signal in a ramp waveform after the driving signal TG pulse is generated. That is, the ramp signal generator 900 generates one ramp waveform signal for each of a reset phase interval and a signal phase interval.

The correlated double sampling circuit block 400 includes a plurality of correlated double sampling circuits CDS1 400-1 through CDSN 400-N. One correlated double sampling circuit is connected to each column signal line. For example, each of the plurality of correlated double sampling circuits CDS1 400-1 through CDSN 400-N performs correlated double sampling processing based on comparison of levels of a ramp signal RMP and a pixel signal input from a column signal line. For example, each of the plurality of correlated double sampling circuits CDS1 400-1 through CDSN 400-N may be provided as a comparator circuit. In detail, if a pixel signal in a reset phase interval and a pixel signal in a signal phase interval are applied to a first input terminal of a comparator circuit and a ramp signal RMP is applied to a second input terminal of the comparator circuit, the comparator circuit outputs a comparator output signal COMP_OUT showing the comparison result in each of the reset phase interval and the signal phase interval.

The analog-to-digital conversion circuit block 500 includes a plurality of analog-to-digital circuits ADC1 500-1 through ADCN 500-N, and each of the plurality of analog-to-digital circuits ADC1 500-1 through ADCN 500-N receives an input of a comparator output signal COMP_OUT of the correlated double sampling circuit connected to a corresponding column signal line.

Referring to FIG. 14, each of the plurality of analog-to-digital circuits ADC1 500-1 through ADCN 500-N calculates a first code value and a second code value. The first code value may indicate a first interval width from a point T1 in time where a ramp signal RMP in a reset phase interval starts to fall, to a point T2 in time where a pulse of a comparator output signal is generated. The second code value may indicate a second interval width from a point T3 in time where a ramp signal RMP in a signal phase interval starts to fall, to a point T4 in time where a pulse of a comparator output signal is generated, and by calculating the difference between the first and second code values, generates digital pixel data of a corresponding pixel. For example, by using a counter, the first and second code values corresponding to the first and second interval widths, respectively, may be obtained.

Digital pixel data for each column signal line generated in the analog-to-digital conversion circuit 500 is stored in the buffer memory 600.

Figure 15:
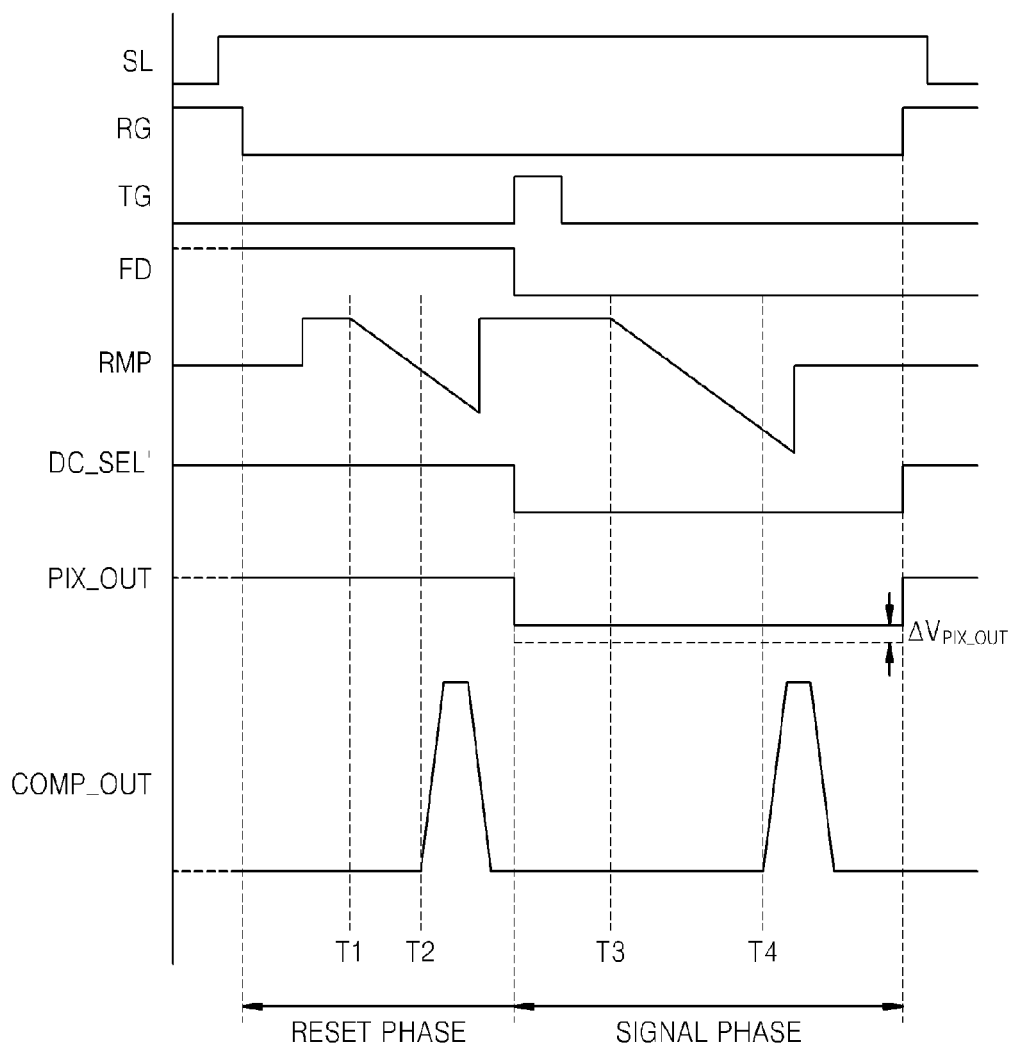
FIG. 15 shows waveforms of major signals in an image sensor according to at least one example embodiment.

Referring to FIG. 15, it is shown that the voltage level of a pixel signal PIX_OUT is raised by $\Delta V_{PIX\_OUT}$ from a dashed line to a solid line in a signal phase interval, according to the level adjustment of the pixel signal PIX_OUT output to each column signal line by the level adjusting circuit block 300B.

Figure 16:
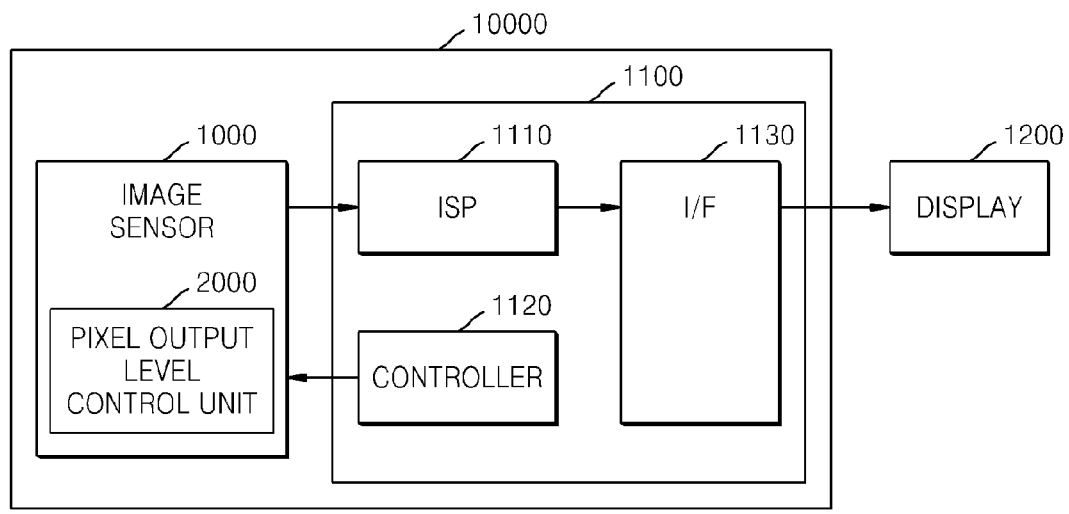
FIG. 16 is a block diagram of an imaging apparatus using an image sensor according to at least one example embodiment.

FIG. 16 is a block diagram of an imaging apparatus 10000 using an image sensor according to at least one example embodiment.

Referring to FIG. 16, the imaging apparatus 10000 may be, for example, a camera, and include an image sensor 1000 and a processor 1100.

The processor may be provided as a microprocessor, an image processor, or an arbitrary different type of control circuit, for example, an application-specific integrated circuit (ASIC). For example, the image sensor 1000 and the processor 1100 may be provided as individual integrated circuits.

The image sensor 1000 is a semiconductor device which converts an optical signal to an electric signal. The image sensor 1000 may include the apparatuses for controlling a pixel level 2000, 2000A, and 2000B shown in FIGS. 9 through 11. Accordingly, the image sensor 1000 may include the level adjusting circuit block 300A or 300B shown in FIGS. 1 and 2, respectively.

The processor 1100 may include an image signal processing unit ISP 1110, a control unit 1120, and an interface unit I/F 1130. The image signal processing unit 1110 receives digital image data output from the image sensor 1000 and performs signal processing according to an initially set standard. The control unit 1120 outputs a variety of control signals required for image sensing operations. The interface unit 1130 passes signal processed data to a display 1200 and thus, the data can be reproduced.

In at least one example embodiment, the imaging apparatus 10000 may be connected to the display 1200. In at least one other example embodiment, the imaging apparatus 10000 may be provided with the display 1200 in one device.

Next, a method of controlling a pixel output level, which is performed in the image sensor 1000 of the imaging apparatus 10000, will now be explained with reference to flowcharts in FIGS. 17 and 18.

Figure 17:
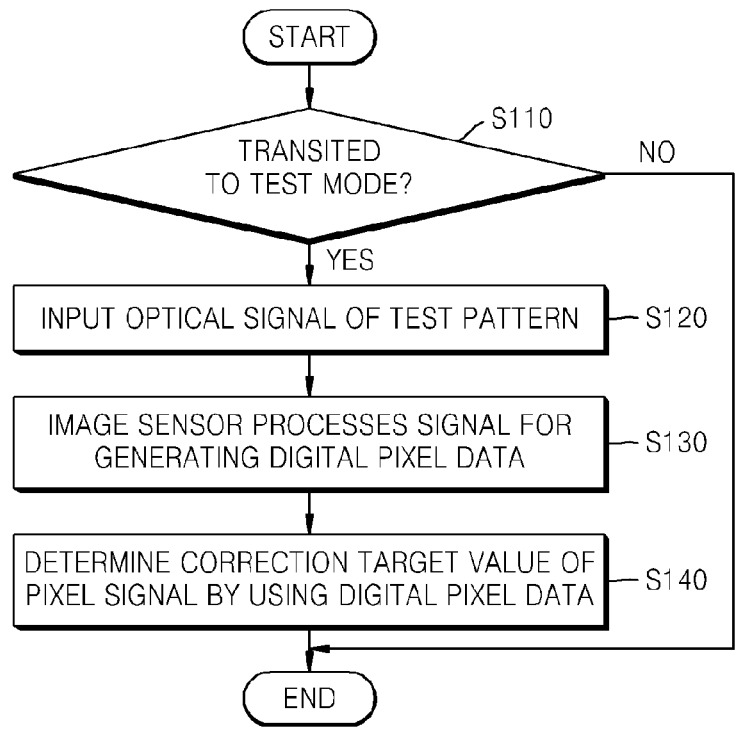
FIG. 17 is a flowchart of a method of setting a bias voltage for controlling a pixel output level, according to at least one example embodiment.

FIG. 17 is a flowchart of a method of setting a bias voltage for controlling a pixel output level, according to at least one example embodiment.

The control unit 1120 determines whether or not the imaging apparatus 10000 is transited to a test mode in operation S110.

For example, a test mode may be a mode for finding a correction target value of a pixel signal, and the imaging apparatus 10000 may be transited to a test mode when initialized. When the imaging apparatus 10000 is initialized, the image sensor 1000 may also be initialized.

When the imaging apparatus 10000 is transited to a test mode, an optical signal of a test pattern is input to the image sensor 1000 in operation S120. For example, the optical signal of a test pattern may be an optical signal of a dark pattern in which light is obscured or blocked out. For example, the control unit 1120 of the imaging apparatus 10000 may control the imaging apparatus 10000, and thus the image sensor 1000 performs an operation of detecting an optical signal when a shutter is closed and in the test mode.

The image sensor 1000 detects an optical signal of a test pattern in the test mode, generates a pixel signal, and performs signal processing for generating digital pixel data based on correlated double sampling processing on the generated pixel signal in operation S130.

The image sensor 1000 determines a correction target value of a pixel signal by using the digital pixel data generated in a test mode in operation S140. For example, a correction target value may be determined based on the difference between digital pixel data and target digital pixel data corresponding to a test pattern. The target digital pixel data corresponding to a test pattern may be set as an initial value. For example, when a test pattern is a dark pattern, target digital pixel data may be set to '0'.

Figure 18:
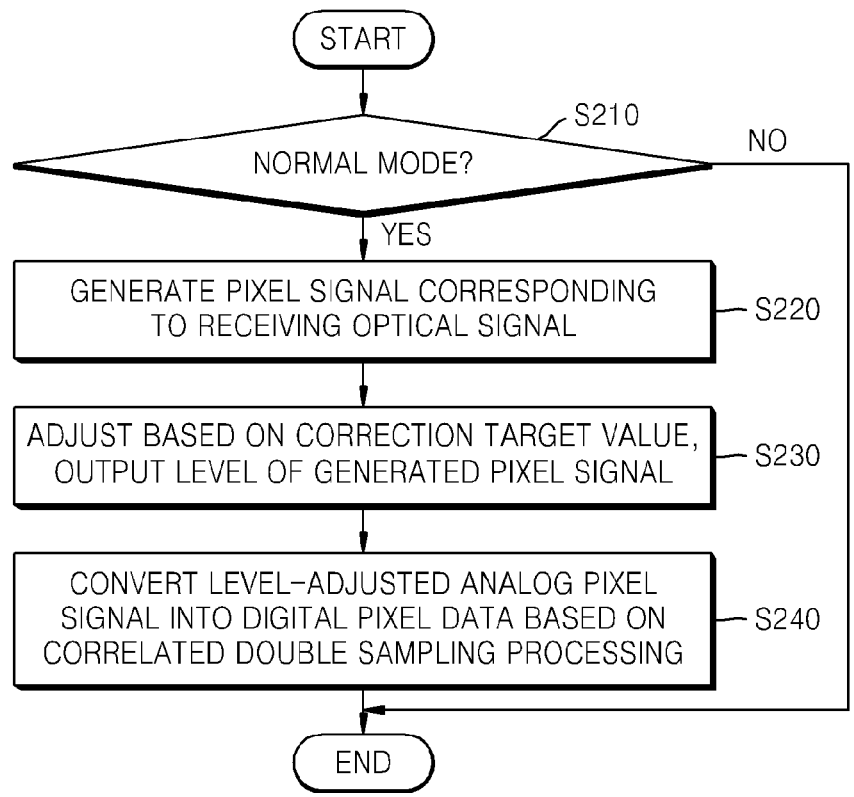
FIG. 18 is a flowchart of a method of controlling a pixel output level, according to at least one example embodiment.

FIG. 18 is a flowchart of a method of controlling a pixel output level, according to at least one example embodiment.

The control unit 1120 determines whether or not the imaging apparatus 10000 is in a normal mode in operation S210. For example, a normal mode may be a mode in which the imaging apparatus 10000 performs normal image data processing after the imaging apparatus 10000 is initialized and completes a test mode. As another example, after the imaging apparatus 10000 is initialized, the imaging apparatus 10000 may enter directly into a normal mode by skipping a test mode.

The image sensor 1000 generates an electric pixel signal corresponding to an optical signal received in each column line in a normal mode in operation S220.

The image sensor 1000 performs an operation for adjusting the output level of a pixel signal generated in each column signal line based on a correction target value in operation S230. For example, the correction target value may be set to an initial value based on a correlated double sampling decision delay quantity. As another example, the correction target value may be determined in a test mode according to the flowchart shown in FIG. 17. For example, the output level of a pixel signal may be adjusted based on a correction target value in any one or both of a reset phase interval and a signal phase interval in a correlated double sampling operation interval.

The image sensor 1000 generates digital pixel data according to correlated double sampling processing on the analog pixel signal in each column signal line, the level of which is adjusted based on a correction target value in operation S240. For example, correlated double sampling processing is performed based on comparison of the levels of a ramp signal and a pixel signal input from a column signal line in each of reset phase interval and a signal phase interval. Then, by using the result of the correlated double sampling processing, digital pixel data is generated. For example, a first code value is calculated and indicates a first interval width from a point in time where a ramp signal in a reset phase interval starts to fall, to a point in time where a pulse of a comparator output signal is generated. A second code value is calculated and indicates a second interval width from a point in time where a ramp signal in a signal phase interval starts to fall, to a point in time where a pulse of a comparator output signal is generated. By calculating the difference between the first and second code values, digital pixel data of a corresponding pixel is generated. For example, by using a counter, the first and second code values corresponding to the first and second interval widths, respectively, may be obtained.

Figure 19:
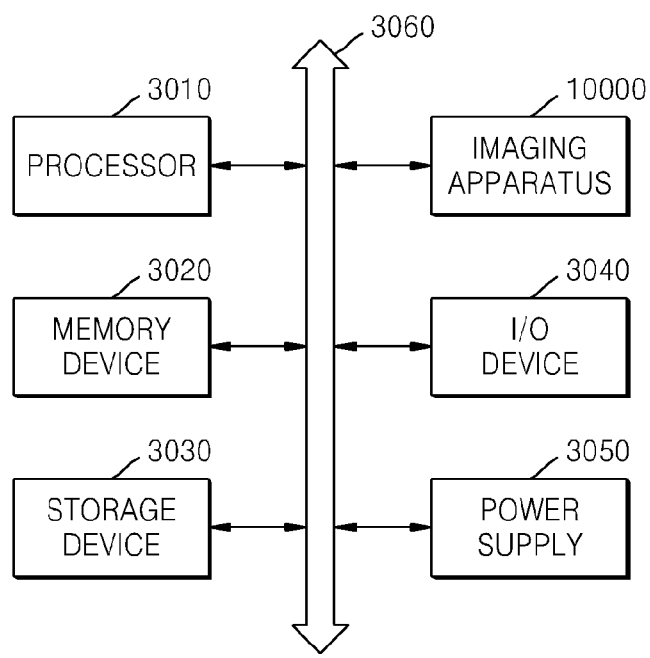
FIG. 19 is a block diagram of a computing system including the imaging apparatus of FIG. 16.

FIG. 19 is a block diagram of a computing system including the imaging apparatus 10000 of FIG. 16.

Referring to FIG. 19, the computing system 3000 may include a processor 3010, a memory device 3020, a storage unit 3030, an input output device 3040, a power supply unit 3050 and an imaging apparatus 10000. Though not shown in FIG. 19, the computing system 3000 may further include ports which allow communication with a video card, a sound card, a memory card, a universal serial bus (USB) device, or other electronic devices.

The processor 3010 performs predetermined calculations or tasks. According to an embodiment, the processor 3010 may be a microprocessor or a central processing unit (CPU). The processor 3010 may perform communication with the memory unit 3020, the storage unit 3030, and the input output unit 3040 through a bus 3060 such as an address bus, a control bus, and a data bus. According to at least one example embodiment, the processor 3010 may also be connected to an expansion bus such as a peripheral component interconnect (PCI) bus.

The memory unit 3020 may store data required for operations of the computing system 3000. For example, the memory unit 3020 may be provided as a mobile dynamic random access memory (DRAM), static random access memory (SRAM), a phase-change random access memory (PRAM), a ferroelectric random access memory (FRAM), a resistive random access memory (RRAM) and/or a magnetic random access memory (MRAM). The storage unit 3030 may include a solid state drive, a hard disk drive, and/or a CD-ROM.

The input output unit 3040 may include an input unit such as a keyboard, a keypad, and a mouse, and an output unit such as a printer, and a display. The power supply unit 3050 may provide an operation voltage required for operations of the computing system 3000.

The imaging apparatus 10000 is connected to the processor 3010 through the bus 3060 or other communication links, and thus performs communication. The imaging apparatus 10000 as shown in FIG. 16 may be provided.

The imaging apparatus 10000 may be provided as a variety of types of packages. For example, at least some parts of the imaging apparatus 10000 may be provided by using such packages as a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flatpack (TQFP), a small outline integrated circuit (SOIC), a shrink small outline package (SSOP), a thin small outline package (TSOP), a thin quad flatpack (TQFP), a system in package (SIP), a multi chip package (MCP), a wafer-level fabricated package (WFP), and a wafer-level processed stack package (WSP).

The computing system 3000 should be understood as all computing systems using an imaging apparatus. For example, the computing system 3000 may include a digital camera, a mobile phone, a personal digital assistance (PDA), a portable multimedia player (PMP), and/or a smart phone.

Figure 20:
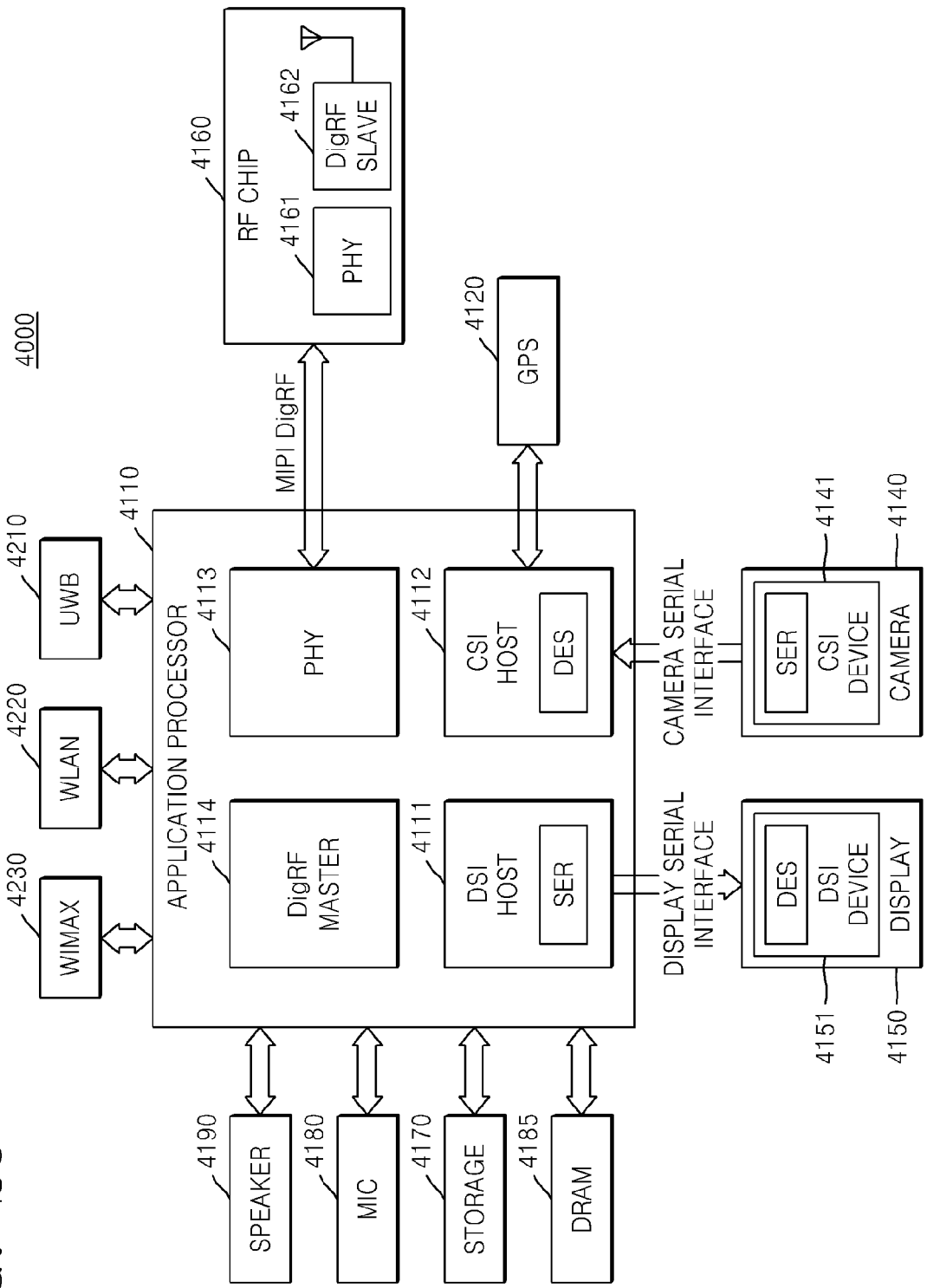
FIG. 20 is a block diagram of an example of an interface used in the computing system shown in FIG. 19.

FIG. 20 is a block diagram of an example of an interface used in the computing system 4000 shown in FIG. 19.

Referring to FIG. 20, the computing system 4000 may be provided as a data processing apparatus using or supporting a mobile industry processor interface (MIPI), and may include an application processor 4010, an imaging apparatus 4140, and a display 4150. A camera serial interface (CSI) host 4112 of the application processor 4110 may perform serial communication with a CSI unit 4141 of the imaging apparatus 4140 through a CSI interface. For example, as the imaging apparatus 4140, the imaging apparatus 10000 shown in FIG. 16 may be applied.

In at least one example embodiment, the CSI host 4112 may include a deserializer (DES), and the CSI unit 4141 may include a serializer (SER). The display serial interface (DSI) host 4111 of the application processor 4110 may perform serial communication with a DSI unit 4151 of the display 4150 through a DSI interface.

In at least one example embodiment, the DSI host 4111 may include a serializer (SER), and the DSI unit 4151 may include a deserializer (DES). In addition, the computing system 4000 may further include a radio frequency (RF) chip 4160 capable of performing communication with the application processor 4110. A physical layer PHY 4113 of the computing system 4000 and a physical layer PHY 4161 of the RF chip 4160 may perform transmission and reception of data according to MIPI DigRF. Also, the application processor 4110 may further include a DigRF master 4114 controlling data communication according to the MIPI DigRF of the physical layer PHY 4161.

The computing system 4000 may include a global positioning system (GPS) 4120, a storage 4170, a microphone 4180, DRAM 4185, and a speaker 4190. Also, the computing system 4000 may perform communication by using an ultra wideband (UWB) 4210, a wireless local area network (WLAN) 4220, and a worldwide interoperability for microwave access (WIMAX) 4230. However, the structure and interface of the computing system 4000 are examples and do not limit the scope of the example embodiments.

While inventive concepts have been particularly shown and described with reference to exemplary embodiments thereof, it will be understood by those of ordinary skill in the art that various changes in form and details may be made therein without departing from the spirit and scope of the inventive concepts as defined by the following claims.

What is claimed is:

1. An apparatus for controlling a pixel output level, the apparatus comprising:
    a column signal line connected to an output node of at least one pixel sensor;
    a load circuit connected between the column signal line and a ground terminal; and
    a level adjusting circuit configured to adjust a voltage level of a pixel signal output from the at least one pixel sensor to the column signal line based on a correction target value, the correction target value indicating an amount by which a delay associated with the pixel signal is compensated, the level adjusting circuit including,
        a current source configured to generate a current corresponding to a bias voltage based on the correction target value; and
        a switching unit configured to provide the generated current to the column signal line based on a switching control signal, the switching unit including a transistor, a first terminal of the transistor being connected to an output terminal of the current source, a second terminal of the transistor being connected to the column signal line,
    wherein, the switching control signal is applied to a gate terminal of the transistor, and
    the transistor is turned on in an interval associated with a correlated double sampling operation based on the switching control signal.

2. The apparatus of claim 1, wherein the correction target value is for one of correcting an offset in the column signal line and correcting a correlated double sampling decision delay.

3. The apparatus of claim 1, wherein the level adjusting circuit is configured to adjust the voltage level of the pixel signal in a range between a maximum voltage level and a minimum voltage level of a ramp signal used in a correlated double sampling operation.

4. The apparatus of claim 1, wherein the level adjusting circuit is configured to adjust the voltage level of the pixel signal in at least one of a reset phase interval when the at least one pixel sensor is in a reset state and a signal phase interval when the at least one pixel sensor is in a readout state.

5. The apparatus of claim 1, wherein the level adjusting circuit is configured to determine the correction target value based on digital pixel data generated as a result of an optical signal of a test pattern sensed by the at least one pixel sensor.

6. The apparatus of claim 1, wherein the load circuit includes an active load configured to generate a current corresponding to a load bias voltage.

7. The apparatus of claim 1, wherein the at least one pixel sensor includes a photodetector and a plurality of transistors, and at least one of the plurality of transistors is a source follower amplifier transistor configured to transmit the pixel signal to the column signal line in a reset phase interval when the at least one pixel sensor is in a reset state and a signal phase interval when the at least one pixel sensor is in a readout state.

8. The apparatus of claim 5, wherein the level adjusting circuit is configured to apply the correction target value in at least one of a reset phase interval when the at least one pixel sensor is in a reset state and a signal phase interval when the at least one pixel sensor is in a readout state.

9. An image sensor comprising:
a pixel array configured to convert an optical signal into a pixel signal and output the pixel signal to a column signal line;
a load circuit connected between the column signal line and a ground terminal;
a level adjusting circuit configured to adjust a voltage level of the pixel signal output to the column signal line based on a correction target value, the correction target value indicating an amount by which a decision delay associated with the pixel signal is compensated;
a correlated double sampling circuit configured to perform a correlated double sampling operation based the adjusted voltage level of the pixel signal and a voltage level of a ramp signal; and
an analog-to-digital conversion circuit configured to convert the pixel signal into digital pixel data based on a result of the correlated double sampling operation,
wherein the level adjusting circuit includes,
a bias voltage generation unit configured to generate a bias voltage based on digital pixel data generated in the analog-to-digital conversion circuit, the digital pixel data being based on an optical signal of a test pattern sensed by the pixel array,
a current source configured to generate a current corresponding to the bias voltage, and
a switching unit configured to provide the generated current to the column signal in an interval associated with the correlated double sampling operation.

10. The image sensor of claim 9, wherein the switching unit is configured to provide the generated current to the column signal line in at least one of a reset phase interval when at least one pixel in the pixel array is in a reset state and a signal phase interval when the at least one pixel is in a readout state.

11. A device, comprising:
a plurality of pixel sensors configured to output pixel signals to column lines;
a voltage adjuster configured to adjust voltage levels of the pixel signals for each of the column lines based on respective target voltage levels, the target voltage level indicating a higher voltage for the pixel signals to compensate decision delays corresponding to the pixel signals;
a correlated double sampler configured to perform a correlated double sampling operation and output resultant signals based on the adjusted pixel signals and a reference signal; and
a converter configured to convert the resultant signals into digital signals,
wherein the voltage adjuster is configured to determine the target voltage levels based on the digital signals of the digital signals represent a test pattern sensed by the pixel sensors.

12. The device of claim 11, wherein the target voltage levels are selected based on one of distortion of the pixel signals caused by the column lines and a delay associated with the correlated double sampling operation, and the reference signal is a ramp signal.

13. The device of claim 11, wherein the test pattern obscures light incident to the pixel sensors.

14. The device of claim 11, further comprising:
an active load connected to each column line at a node between the voltage adjuster and the correlated double sampler.

* * * * *